United States Patent
Stacey et al.

(10) Patent No.: US 6,728,254 B1
(45) Date of Patent: Apr. 27, 2004

(54) MULTIPLE ACCESS PARALLEL MEMORY AND METHOD

(75) Inventors: Dave Stacey, Stansted Abbotts (GB); Fai Tsang, South Woodham Ferrers (GB); Simon Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/411,283

(22) Filed: Oct. 4, 1999

(30) Foreign Application Priority Data

Jun. 30, 1999 (GB) .............................................. 9915341

(51) Int. Cl.$^7$ .............................................. H04L 12/54
(52) U.S. Cl. .................. 370/413; 370/395.71; 370/419; 711/147; 709/105; 714/52
(58) Field of Search ........................... 370/395.61, 469, 370/474, 230–235, 250–254, 395.52, 395.7–395.72, 412–421; 709/105, 207; 714/52; 711/148–154

(56) References Cited

U.S. PATENT DOCUMENTS

| | | | | |
|---|---|---|---|---|
| 5,193,071 A | * | 3/1993 | Umina et al. | 365/189.01 |
| 5,276,681 A | * | 1/1994 | Tobagi et al. | 370/229 |
| 5,544,329 A | * | 8/1996 | Engel et al. | 710/6 |
| 5,918,073 A | * | 6/1999 | Hewitt | 710/52 |
| 5,918,248 A | * | 6/1999 | Newell et al. | 711/147 |
| 5,982,776 A | * | 11/1999 | Manning et al. | 370/414 |
| 5,983,311 A | * | 11/1999 | Huang | 711/102 |
| 5,999,531 A | * | 12/1999 | Ferolito et al. | 370/390 |
| 6,108,336 A | * | 8/2000 | Duault et al. | 370/395.6 |
| 6,125,413 A | * | 9/2000 | Baruch et al. | 710/52 |
| 6,134,607 A | * | 10/2000 | Frink | 710/22 |
| 6,160,812 A | * | 12/2000 | Bauman et al. | 370/416 |
| 6,286,076 B1 | * | 9/2001 | Schultz | 711/101 |
| 6,295,575 B1 | * | 9/2001 | Blumenau et al. | 711/5 |
| 6,360,287 B1 | * | 3/2002 | Kawamura | 710/61 |
| 6,393,548 B1 | * | 5/2002 | Kerstein et al. | 712/43 |
| 6,463,032 B1 | * | 10/2002 | Lau et al. | 370/218 |
| 6,509,988 B1 | * | 1/2003 | Saito | 359/152 |

OTHER PUBLICATIONS

Omundsen et al , A Pipelined, Multiprocessor Architecture for Connectionless Server for Broadband ISDN (8426 IEEE/ACM Transaction on Networking, 1994).*
Hill et al, Asynchronous Transfer Mode Receiver, (8049e IEE Proceeding–E, 1992).*
Tomimitsu et al, An ATM chip set for high performance computer interfaces affording over 100Mbps sustained throughput (NEC corporation).*
Mummert et al, Fine Grain Parallel Communication on General Purpose LANS (ACM–089791), 1996.*

* cited by examiner

Primary Examiner—Kenneth Vanderpuye
Assistant Examiner—Van Nguyen
(74) Attorney, Agent, or Firm—Barnes & Thornburg

(57) ABSTRACT

A memory architecture for multiple inputs comprises a common memory structure having a plurality of data locations for storing data units and an input section for providing a plurality of input ports with access to the common memory structure. The input section includes a memory buffer for each input port which can store a number of data units equal to the number of input ports, and a bus allowing each memory buffer to write a plurality of data units across the memory structure at least once during a memory-access cycle. The common memory structure includes a number of memory banks equal to the number of input ports. This structure enables the memory banks to be implemented as low speed devices. The memory architecture is suitable for use in ATM system components.

21 Claims, 5 Drawing Sheets

MULTIPLE ACCESS PARALLEL MEMORY AND METHOD

FIELD OF THE INVENTION

This invention relates to a memory architecture with multiple input ports. In particular it relates to a high throughput parallel memory shared across a number of input ports.

BACKGROUND OF THE INVENTION

A number of fields, including telecommunications, require a common memory structure for data received simultaneously through multiple input ports. ATM (Asynchronous Transfer Mode) is one example of a communications protocol for which a shared memory architecture is of particular benefit, as a result of the different data types supported by the protocol, and the requirement to multiplex together signals from different sources (for example audio and video).

A key component of ATM is the adaptation function. This provides the mechanism that adapts the carried service (e.g. voice, data) to and from the ATM domain. Several adaptation layers have so far been defined. ATM Adaptation Layer 1 (AAL1) is designed to adapt constant bit rate services (predominantly voice or video) into fixed length ATM cells. A key feature of AAL1 is that it enables the timing relationship between the transmitter and receiver to be maintained over the asynchronous network. AAL5 however has been predominantly designed to support data services. As such it provides a mechanism to segment long data packets into fixed length ATM cells and a mechanism to enable the integrity of the reassembled data packet to be validated after transmission across the network. AAL5 is also being used in certain applications to carry voice services (particularly in computer desktop applications) where AAL5 technology is readily available.

Both AAL1 and AAL5 adapt the carried service into a stream of fixed length ATM cell payloads. However for certain compressed voice services the length of the ATM cell payload (48 bytes) is too large; its use would lead to a large packetisation delay that in turn would affect existing network delay budgets and acceptable voice characteristics. To resolve this problem AAL2 has been defined. AAL2 supports a multiplex of user channels within a so-called single Virtual Channel Connection (VCC). Each user channel is carried in a stream of 'mini-packets'—the length of the mini-packet payload for each channel can be defined according to the packetisation delay that can be tolerated. AAL2 allows a single virtual channel (VC) to support multiple diverse services. In other words, a number of simultaneous voice, video and data channels can be multiplexed together to reduce packetisation delay. Furthermore, AAL2 introduces a new switching layer above the ATM layer, for switching a mini-packet connection between channels.

There is a general need to provide a functional partitioning of an adaptation layer technology that enables these interworking requirements to be met with the flexibility to carry a call in any of the AALs. A key requirement of any adaptation layer partitioning is such that it optimises buffering apportionment in order to minimise the delay through any system and to minimise the memory and hence cost requirements of any implementation.

The need for a multiple access common memory structure is therefore apparent, to enable data from different sources to be processed and retransmitted at subsequent time intervals. To avoid data loss the memory must have the capacity to absorb data at the combined peak rates of all of the inputs.

One approach is simply to provide a unitary memory device capable of absorbing data at the combined peak rates of all of the input ports, with the most recent input written into the memory in the current cycle. However, the throughput capacity of currently available memory devices limit the number, or data rates, of the input ports in any practical application. Thus, the need for a development in the throughput of multiple access memory devices is highlighted. It is also possible to provide separate memory devices for each of the input ports. However, each memory device must then be capable of absorbing at the peak instantaneous data rate of its respective input port. This strategy is less optimum in terms of memory efficiency and complexity than providing a single common memory storage area. Furthermore, there is still a requirement to multiplex the data together after the separate memory buffers if the inputs carry data from multiple sources as in the AAL2 structure.

Another possibility is to provide a memory capable of a throughput equal to the mean data rate of the input ports and to absorb data-rate fluctuations at each input port with suitable memory buffers. Each input port may be provided with a rate adaption FIFO capable of operating at the peak rate of the port. Each FIFO must be deep enough to absorb any fluctuations that may occur from the mean data rate. A multiplexer stage is required between the FIFOs and a common memory. This approach requires a careful balancing of FIFO depth and dilation rates against losses due to FIFO overflow. This strategy suffers a principal disadvantage in that the provisioning of the FIFOs requires detailed knowledge of typical peaks and troughs in the data rates through the input ports. Given that current communications networks experience highly random data rates, this strategy may result in equipment inefficiencies or data loss. A second disadvantage is that the FIFOs, in this strategy, cause an additional stage of data queuing resulting in data delays.

There is a need for a single stage, common memory that is capable of absorbing the combined maximum instantaneous data rates of a number of input ports while being capable of implementation using individual memory devices that need only operate at less than the maximum rate. This would allow the prevention of data loss irrespective of the traffic profiles at the input ports, providing the total payload memory is not exceeded.

In applications where asynchronous data streams, such as ATM AAL2, are employed it may be advantageous in some situations, such as multiple port interconnection, to have available a common memory capable of receiving data packets and partial data packets and storing them contiguously.

Applications where time-sensitive data is transmitted via an asynchronous system require data losses to be replaced, in sequence, with interpolated data. This may place higher instantaneous data-rate demands on the memory. It would also require some facility for writing interpolated data to the common memory in the correct relationship with correctly received data.

SUMMARY OF THE INVENTION

According to the present invention, there is provided a memory architecture comprising a common memory structure having a plurality of data locations for storing data units and an input section for providing a plurality of input ports with access to the common memory structure, the input section including:

at least one memory buffer provided for each input port, each memory buffer capable of storing a number of data units at least equal to the number of input ports; and at least one data bus allowing each of the memory buffers to write a plurality of data units substantially simultaneously to the memory structure at least once during a memory-access cycle, the common memory structure including a plurality of memory banks equal to or greater than, in number, the number of input ports, each memory bank being accessible substantially simultaneously to receive data from a memory buffer.

The invention provides a set of memory buffers corresponding to a set of input ports, and a series of individual memory banks arranged in parallel and equal (or greater) in number to the number of input ports. A data word from each memory buffer may be written simultaneously across the series of memory banks, so that a high throughput memory is formed from a number of low throughput memory banks. The invention provides a common memory that is also capable of providing fair or prioritised access to memory locations for multiple input ports.

The input ports may be prioritised into at least one high priority input port(s) and at least one low priority input port(s), wherein the at least one low priority port(s) are enabled to write to the memory structure during a memory-access cycle in place of at least one high priority port(s) when a given data rate condition for the at least one high priority input port(s) is satisfied and disabled otherwise.

Low priority data may "steal" a memory-access phase from one of the higher priority memory buffers. This allows low priority data, such as control data, to be interleaved with high priority data, such as audio data, during phases of the memory-access cycle when input data rates are relatively low.

Packet-management control circuitry may be provided to identify the start and end of data-packets and partial data packets, and provide that the start of each data packet is written to a predetermined memory bank.

The memory is thus also adaptable to cater for high throughput of data words of varying typical lengths. The packet-management control circuitry is preferably further adapted to record at which memory bank the end of each partial data packet was written to, and provide that any subsequent partial packet, for the same packet, is written to the next memory bank in a predetermined write-address sequence, whereby partial packets are written contiguously in the memory structure in a predetermined write-address sequence.

The memory architecture may include at least two sets of memory banks, each set of memory banks being addressed independently during the memory-access cycle, so that two independent write operations may be performed simultaneously.

For example, one or more of the memory buffers may be provided with an additional, interpolation buffer able to write data to one of the sets of memory banks substantially at the same time that a memory buffer writes to another set of memory banks. Interpolation is used to replace missing data from the received data sequence.

The use of multiple sets of memory banks is also useful in cases where received data words tend not to be long enough to fill a complete series of memory banks, and the series of memory banks is thus divided to support two or more independent write-addresses.

The invention also provides a method of storing serial data received from a plurality of input ports in a common memory structure for storing data units, the common memory structure including a plurality of memory banks equal to or greater than, in number, the number of input ports, and wherein each of the input ports is associated with at least one memory buffer capable of storing a number of data units at least equal to the number of input ports, the method comprising:

providing communication between each of the plurality of memory buffers and the common memory structure during a memory-access cycle;

writing a plurality of serial data units from at least one of the memory buffers across a plurality of memory banks substantially simultaneously during a phase of the memory access cycle allocated to that memory buffer.

This method enables low speed memory devices to be used in a common memory structure, by providing the possibility of simultaneous writing to all memory banks in each phase of the memory access cycle.

BRIEF DESCRIPTION OF THE DRAWINGS

Examples of the present invention will now be described in detail with reference to and illustrated in the accompanying drawings, in which.

DETAILED DESCRIPTION OF THE INVENTION

Figure 1:
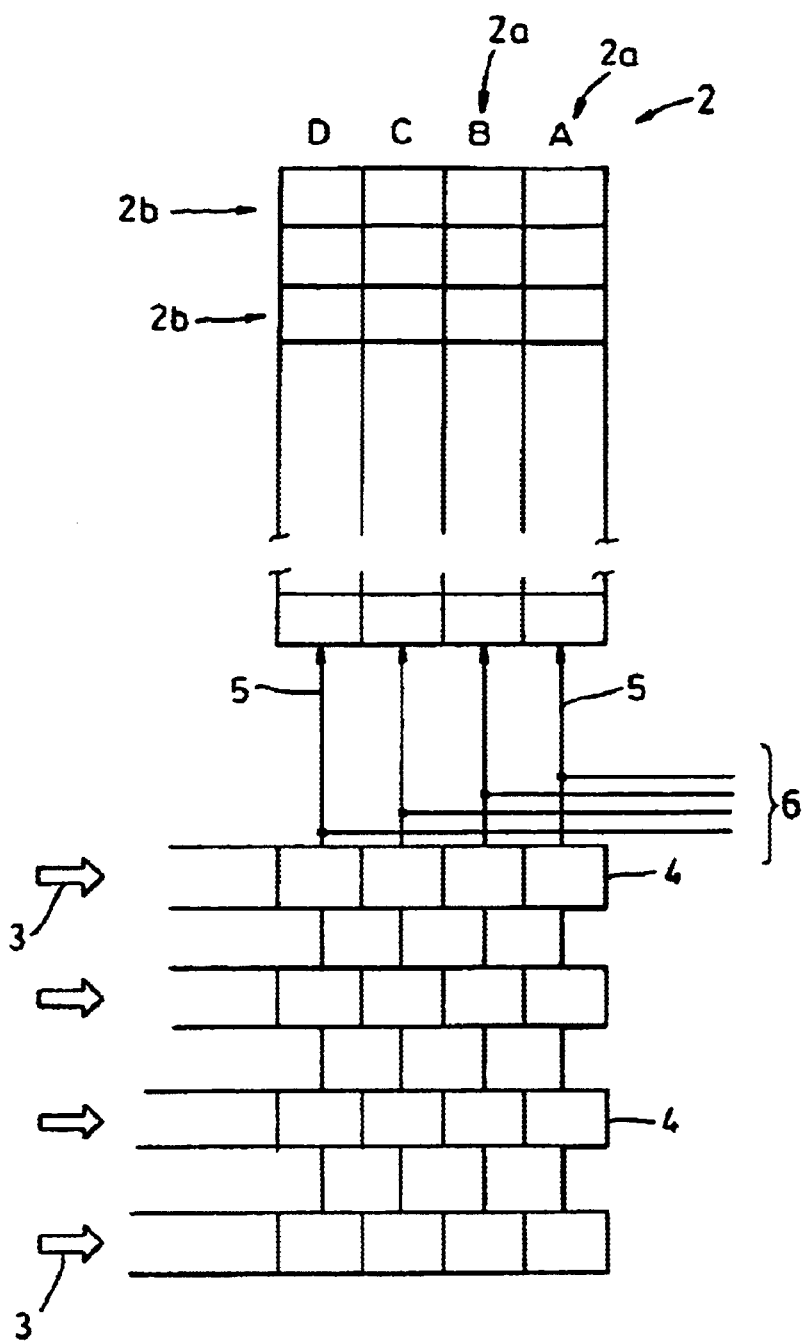
FIG. 1 shows schematically a memory architecture in accordance with a first embodiment of the present invention, which includes a common memory structure and multiple access ports.

A multiple access memory architecture 1 is schematically shown in FIG. 1. A memory structure 2 is depicted as a matrix in which columns A to D represent a series of memory banks 2a and rows depict memory slots 2b. A number of slots 2b may be considered to make up a memory area, for storing separate data items. Each memory bank consists of random access memory (RAM) devices, each comprising octet wide memory locations in the specific example to be described. This embodiment is described with reference to a memory with four input ports, although any number (n) may be provided.

A set of input ports 3, for incoming data, are terminated by a corresponding set of memory buffers 4. Data may typically be received at all of the input ports 3 simultaneously. The memory buffers 4 are typically first in, first out (FIFO) memory registers which have a depth of octets equal to the number (n) of input ports 3.

A data bus, depicted by arrows 5, is provided for transferring data from the set of memory buffers 4 to the memory structure. In this particular embodiment, all of the memory buffers 4 communicate with a single data bus 5 which has a link to each of the memory banks A to D. Control lines 6 can either enable or disable communication along the individual lines of the bus 5. The buffers 4 and bus 5 together comprise an input section.

The multiple access memory architecture 1 is now described with reference to its typical operation. Data is received simultaneously at all of the input ports 3 where it is temporarily held in the set of memory buffers 4. Data from each of the memory buffers 4 is written across all banks A to D of the memory structure 2 during an assigned phase of a memory-access cycle, namely a cycle in which all input ports are able to write to the memory in sequence. Thus, the memory-access cycle consists of four phases, each corresponding to a different memory buffer 4. As the depth of each memory buffer 4 is equal to the number (n) of input ports 3, incoming data may be stored in each memory buffer 4 until the advent of the assigned phase of the memory-access cycle for that memory buffer. At this point all the data stored in the memory buffer is written across the banks A to D of the memory structure.

During the previous memory access cycle, each buffer will receive a variable quantity of data, so that any number of the buffer octet storage locations may be filled with received data. Therefore, control circuitry is provided that can enable or disable independently the writing of data to each memory bank A to D, using the control lines 6.

The FIFOs effectively allow a serial to n-octet wide parallel conversion. For example, the first octet received by a FIFO may be written to memory bank A, the second to bank B and so on. This serial-to-parallel writing from each buffer to a slot 2b, across the set of memory banks 2a, occurs within one phase of a memory-access cycle and may be considered a simultaneous event.

All payloads (namely a string of related data appearing at one input) are written to the memory structure across all banks. For example, the memory structure 2 is typically implemented using (n) (4 in this example) banks of octet wide memory. All data payloads are written into the memory across all of the memory banks 2a. For example, the first octet of a data packet payload (plus, in this example, the 5th, 9th, 13th . . . ) is always written into a given memory bank, (memory bank A for example), the second octet of a data packet payload (plus, in this example, the 6th, 10th, 14th . . . ) is always written into the next memory bank (memory bank B for example) and so on. A full payload is stored in multiples slots.

A single data slot 2b of the memory structure 2 will provide a set of contiguous locations equal in number to the number (n) of memory banks 2a multiplied by the width (f) of each memory bank 2a.

Payloads from the different inputs 3 will be assigned to different memory areas, although each memory area will span the full width of the memory structure. For allocation of memory areas, a free list is provided of spare memory areas (each comprising a number of whole slots 2b), and a status store is provided to indicate the locations of the starting address of the different packets stored in memory.

Therefore, it is only necessary to record a base address for each data payload to enable a payload that has been fully assembled into the memory structure 2 to be subsequently located and read. As each data word is written starting at bank A, for example, only the start point A of the first slot of the memory area corresponding to the data payload is enough to define its address. Similarly, a single write address pointer is also sufficient to load the data from a FIFO 4 in its phase of the memory access cycle into a slot 2b of the memory.

On a single data link, back-to-back data words may be transmitted provided they are an integer multiple of the number of parallel memory banks. For example if 4 data banks are used then a data word of 8 octets long may be immediately (with no gap on the data link) followed by another data word. If however this following data word is not an integer multiple of the number of data banks then it must be proceeded by a gap on the data line whose length must be sufficient (or greater) to effectively pad the last data word to an integer multiple of the number of the banks. For example, again assuming 4 banks of memory, then a 7 octet word must be followed by a gap of at least one octet in length, a 6 octet word must be followed by a gap of at least two octets and so on.

Each input port 3 is granted access, via its respective memory buffer 4, to the full set of memory banks 2a in a cyclic manner, each nth phase of the memory-access cycle. Therefore, if the memory access rate of each memory bank 2a is M Hz, each bank being 1 octet wide, then n*M*8 bits can be written into the memory each second, so that a bit rate of M*8 can be supported on each input. For example, the use of 4 banks of 78 MHz dual-port RAM's will support a data rate of 78×8=624 Mbits per second on each input. A common access rate in current telecommunication network is 622 Mbits per second. The memory architecture 1 in the example above will accommodate this peak rate at each of the input ports.

At each phase of the memory-access cycle, between 1 and (n) octets can be written into the memory structure 2 using a single write address pointer. For a data payload received over a single input port, the write address pointer is advanced according to the number of banks to which data is written during that phase of the memory access cycle, since a variable number of banks will be written to in that phase, depending upon input data rate during the previous memory access cycle. This process ensures that once completed, a data payload appears contiguously across all (n) banks with the first octet always appearing in bank A, for example. If the data words are received in a contiguous fashion on each link (one full data word being transferred prior to the next data word being transmitted on each link) then the process is analogous to a segmentation process whereby the data word is segmented and written into the data memory in a series of (n) octet chunks, where one (n) octet chunk is a single memory slot 2b.

This memory architecture can also be extended to enable data words to be received in a fragmented fashion. In this case, each complete data word is received as a number of smaller fragments. The fragments of one data word will be interleaved with fragments of other data words on the same input port. This may arise when data words are assembled over time, for example from periodic voice samples.

Ideally, a partial fragment size of a number of octets equal to an integer multiple of the number (n) of memory banks 2a is chosen, to prevent any unnecessary requirement to add gaps between fragments received at the input ports. These gaps would otherwise be required to enable different fragments to be stored in different slots 2b, associated with different memory areas, since a single write address pointer is used to define the write locations of all octets in a buffer. All data words therefore are ideally received at the input ports as a series of g fragments of this predetermined length followed by a final fragment of arbitrary size to complete the arbitrary length payload.

The device is therefore extended to be able to maintain a per data word, record of the next location (data slot) in memory to enable it to assemble the fragments into a single contiguous block in memory. For each fragment received, the first octet is still always written to bank A and so on provided the fragments cane be arranged to have the predetermined length. Thus back-to-back partial payloads can be transmitted on the link as there is no requirement to realign partial payloads to an arbitrary phase of memory.

However in some applications (especially as the number of data banks becomes large), the transmitted data words (or fragments) may now tend on average to be less length than the minimum data size corresponding to a full slot across the memory structure. This reduces the efficiency of the process by requiring a greater proportion of the link bandwidth to be used up for the mandatory gaps. This can be overcome if required by extending the invention such that two independent writes may be performed on each data link at each access interval. The process is now capable of supporting 2 independent write addresses to a series of 2n banks (one address to banks 1 to n, the other to banks n+1 to an). Further new data words may now be started at one of two possible offsets in the memory architecture (either at bank 1 or bank n+1)—this information must be recorded as part of the general control information to enable the data word to be subsequently located and reassembled during the read process.

The starting phase of each new data word (either bank 1 or bank n+1) is arbitrarily chosen dependent on the phase of the last received data word. Thus if a new word is received immediately after completion of a proceeding word whose last data samples were written into the low order banks of memory then the new word will be written starting at phase n+1 and vice versa. This process ensures that it is never required to write to the same memory banks in the same access cycle. In summary the extended process reduces the requirement to transmit data as integer multiple of the number of banks (or to pad accordingly) to a requirement whereby the data word size must be an integer multiple of half the number of banks.

Figure 2:
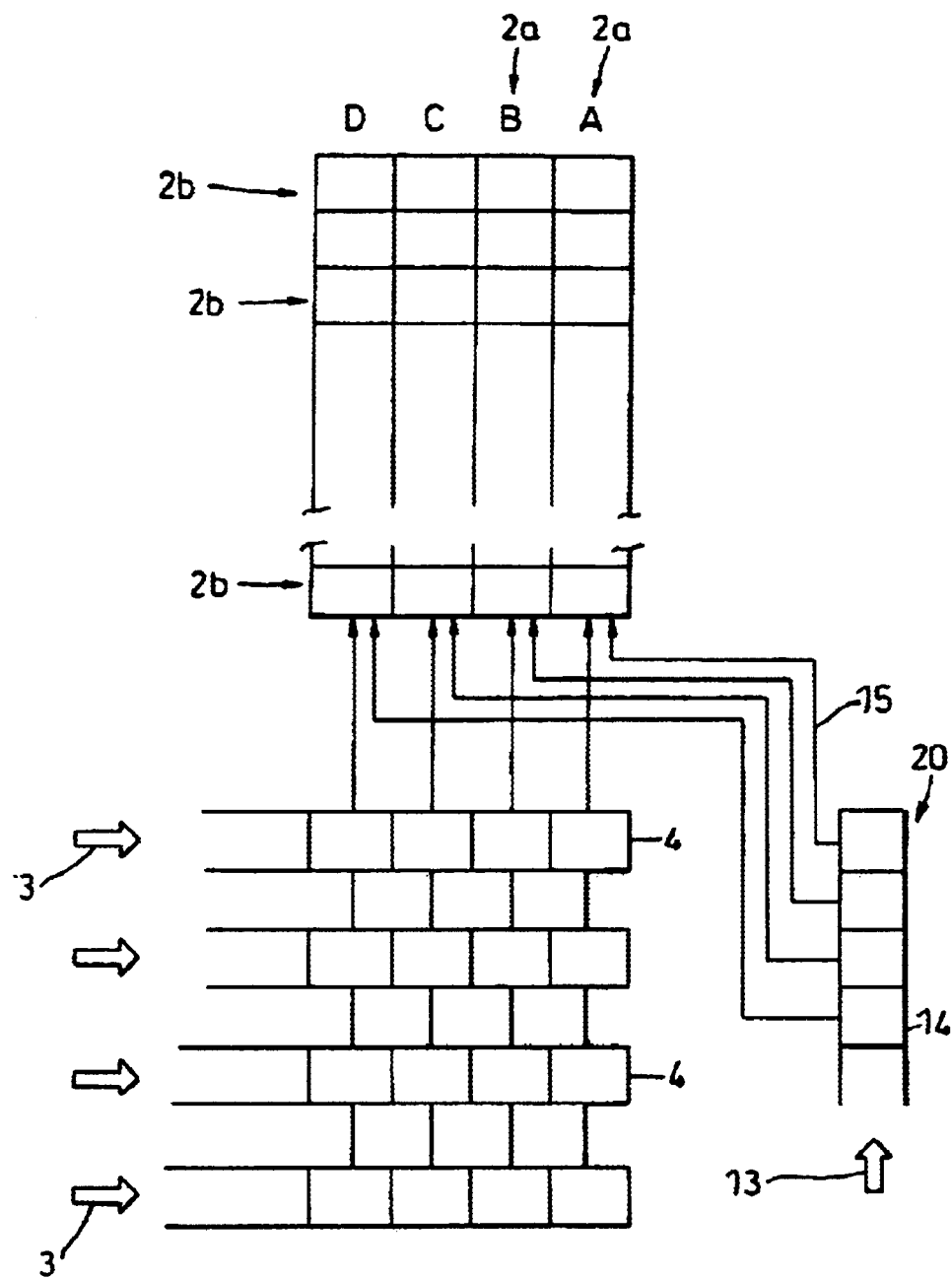
FIG. 2 shows schematically a memory architecture in accordance with a second embodiment of the present invention which allows additional control data to be interleaved with the input data.

Not only will the data words and fragments be of variable length, but the fragments will generally be interleaved with fragments from other data packets. To load different fragments from a single buffer content into different memory areas (because they relate to different payloads), more than one write address pointer will again be required. A number of write address pointers corresponding to the number of different memory areas (i.e. the number of different payloads from which the data originates) is required. A second embodiment of the present invention is a multiple access memory 10 with an additional, low priority input port 13. In FIG. 2, a single low priority port 13 is shown, although more than one may be provided. Additional control logic is provided so that data received at the low priority port 13 may be interleaved with data received at the high priority ports 3. The memory architecture also includes a low priority memory buffer 14 and an additional data bus 15 for the memory buffer 14. The low priority port 13, memory buffer 14 and bus 15 are collectively referred to as a low priority interface 20.

A low priority data word is substituted for a high priority data word during a phase of the write access cycle in which the data rate into a high priority input port is low. Input data is held in a high priority memory buffer 4 for an extra write access cycle and low priority data is written in its place. Typically, this may be used to interleave control data into the common memory. The low priority input ports control data flow on a word-by-word basis to gain access to the memory in addition to the high priority ports. In one particular application, intelligence is provided at a low priority data source which only transmits data when the low priority memory buffer has spare capacity.

Preferably, the memory buffer 14 is a shallow rate adaption FIFO which may be a two words deep, for example. This would allow one data word to be written to the memory while a second is transmitted to the low priority input port 13.

The low priority interface 20 may access the memory 2 by deploying a "memory-access stealing" mechanism. Various criteria for when this mechanism should be implemented will be apparent to those skilled in the art. In one embodiment, data rates at each input port 3 are monitored. When little or no data is received at one of the input ports 3 during a phase of the memory-access cycle, a data word from a low priority input port is written to the memory. This occurs during the phase of the memory-access cycle which corresponds to the empty data slot at the input port. This process may be repeated until the low priority data word is completely written to the memory 2. Thus, low priority data may be interleaved with high priority data with no sacrifice to the instantaneous throughput of the memory 10 at the high priority ports.

A separate memory area will be allocated to the control data, and if a single write address pointer is to be used, the control data is written across the memory banks in the known predetermined sequence. It is also possible for control data to be interleaved with a partially full memory buffer 4, and in this case two write address pointers will be required to allocate the data on the different busses 5,6 to different memory areas.

Figure 3:
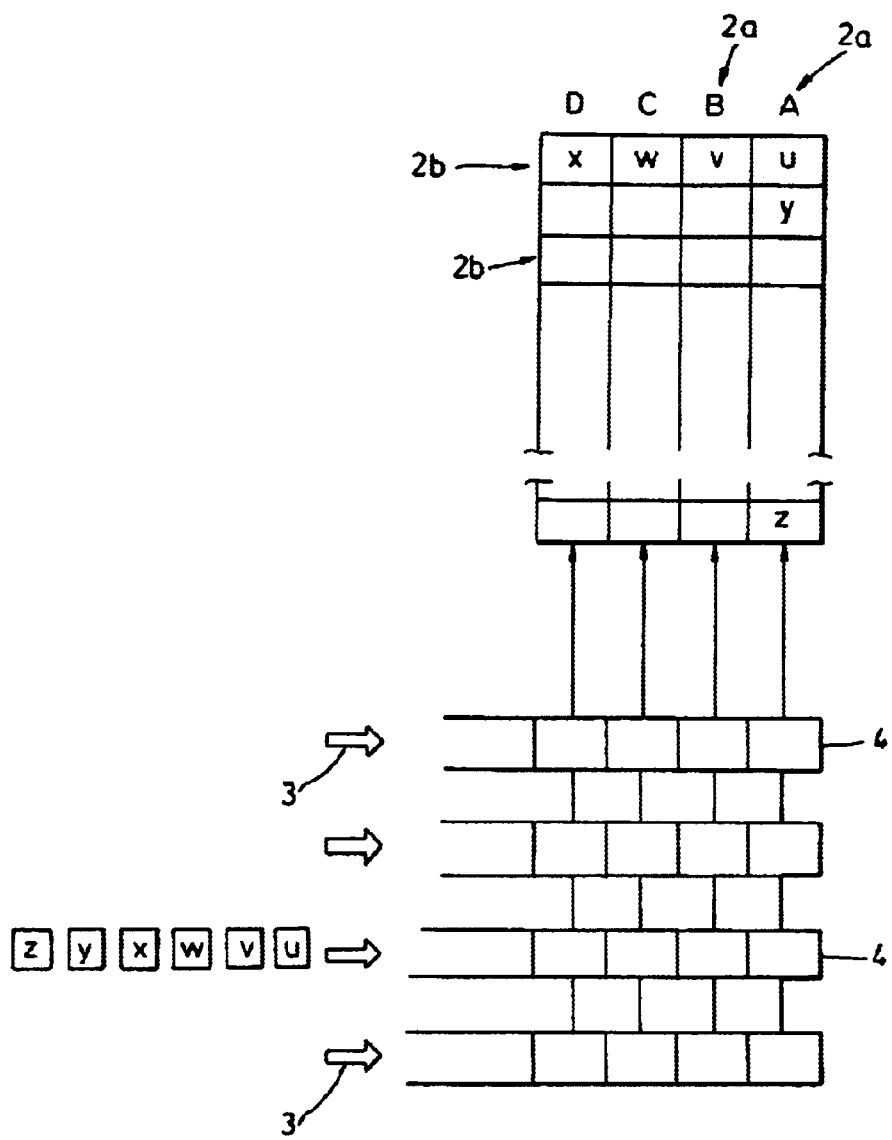
FIG. 3 shows schematically a memory architecture in accordance with a third embodiment of the present invention which allows variable length data.

An alternative embodiment of the present invention relating to an asynchronous data transmission is schematically shown in FIG. 3. One such application is the interconnection of terminals in an ATM AAL2 network which is for transmission of voice data in the ATM packet structure. An ATM cell has a header of 5 octets and a payload of 48 octets. This payload can contain a number of compressed voice samples.

Data words may be received as either complete AAL2 data packets or in the form of partial AAL2 data packets, which occur at either the start or end of ATM cells. Several data packets may be multiplexed together in one ATM cell for transmission to a single input port. It is generally advantageous to demultiplex packetised data and store signals from different payloads at separate memory areas before retransmission to other terminals. Demultiplexed partial data packets should, ideally, be joined at the memory as contiguously written complete data packets. These data packets should also be easily accessible in terms of memory addresses. In this application the 4 byte AAL2 header control information is used to control the demultiplexing process—the control information is used to generate the per packet control word and is not in itself stored in the common memory.

The length of the complete data payload is also variable, and can not be controlled to correspond to a whole number of memory slots, namely having a number of octets which are integer multiples of the number of memory banks. If data words of non-integer multiple lengths are received and written to the memory as they were received, one memory slot may include data from two different data words. This would not allow data to commence always at the same bank, which enables a single address pointer to be used.

Accordingly, an asynchronous-compatible memory architecture according to an alternative embodiment of the present invention includes additional control logic, and is configured to receive data words of arbitrary length as a series of partial data packets several of which may appear in a single ATM word. This embodiment is schematically shown in FIG. 3 with reference to an example where data is received at one of four input ports and is written to a memory structure having four banks. Here the memory banks are again depicted as banks A, B, C, and D.

FIG. 3 shows a series of partial data packets u, v, w, x, y and z, where u–y comprise a portions of a packet from a first payload and z comprises a first partial packet of a different payload.

As will be understood by those skilled in the art, each packet or partial packet includes a header including identifying information. Suitable control logic is provided for the memory architecture so that the start of each data packet may be identified. The first octet of each new data packet is written to the memory 2 at the same memory bank A, for example. The data packet is written to the memory at banks A to D of one memory slot and at bank A of the next slot allocated to the particular input port.

Therefore full data packets are always written into the memory starting at bank A. Since the data packets are arbitrary size there is the need between successive packets to realign the process such that the latter packet is again written into bank A. This is achieved by using the 3 octet interval between the two packet payloads (the header of the latter packet) to realign the process to bank A. Since the maximum realignment is always 3 octets this can always be achieved.

Due to the asynchronous nature of ATM, the receiving device will receive partial packets at the start and end of the ATM word, for example partial packet z above, which is the start of a new AAL2 packet. The memory bank in which the last partial packet is written must be stored, so that when the next ATM word arrives, the remainder of that packet can be written in the correct sequence, so that a contiguous memory area is filled, and can be addressed with a single read address.

When an ATM cell starts with a partial packet, which is the end of an already existing AAL2 packet, the writing into memory must be aligned with the existing partial packet already stored in memory. To do this, the memory bank of the last written octet is used to realign the partial packet, so that the next partial packet is written into the correct memory bank. Of course, this may result in up to three octets of the buffer being empty in the first access phase, with the corresponding data lines between the memory buffer and the memory banks being disabled.

This may appear sub-optimal in terms of memory throughput. However, in AAL2 applications partial packets only occur at the start of ATM cells, and there is a mimmum 6 octet gap between adjacent ATM cells, as a result of the 5 octet ATM cell header and an additional AAL2 control octet transmitted in the first payload octet of the ATM cell. This gap provides the necessary slack time to accommodate the sub-optimal write. The depth of the memory buffers may also be increased to guarantee that any combination of received AAL2 partial packet payloads can be absorbed. In the case of the memory with four input ports, FIFO's 8 octets deep will be typically sufficient.

The memory architectures described above may be adapted according to a further embodiment of the invention to include 2n memory banks for n input ports.

For example a memory having 4 input ports may be provided with 8 octet wide memory banks. If each input port receives data at 622 Mb/s, for example, then each memory bank will only be required to operate at 39 MHz.

To support 2n octet wide memory banks, the memory buffers will need to be 2n octets wide. Each memory buffer of this embodiment is able to write 2n octets of data to the memory banks during each memory-access cycle. Therefore received data words can be written as multiples of 2n octets.

In some applications, the length of received data packets may tend to be less than 2n octets in length, meaning the 2n octet memory may be inefficient, because of the number of unfilled slots, since each memory area, allocated to different packets/payloads comprises a number of complete slots.

For this type of application the above described memory architectures may be further adapted to form a dual-mode memory architecture according to another embodiment of the present invention. The dual-mode memory architecture has a memory structure which provides two sets of memory banks that may be written to independently. Alternatively, they may be combined as a 2n octet wide block.

This dual-mode memory architecture requires two independent write address pointers, one for each set of banks. For example, memory banks 1 to n may provide one independent write address, while banks n+1 to 2n provide another. The first octet of data words may be written to bank 1 or bank n+1. Additional address information must be recorded as part of the general control information to enable the data word to be subsequently located and reassembled during the read process. It will be apparent to those skilled in the art that any multiple of n memory banks may be used and any number of independent write addresses may be supported.

The starting address of each received data word may be chosen dependent on in which memory bank the previous data word ended. If, for example, a data word ended in the low order memory banks, the next data word may be started in high order memory banks, and vice versa.

This process ensures that it is never required to write to the same memory banks in the same access cycle, and reduces the requirement to transmit data having a number of octets which is an integer multiple of the number of memory banks.

Figure 4:
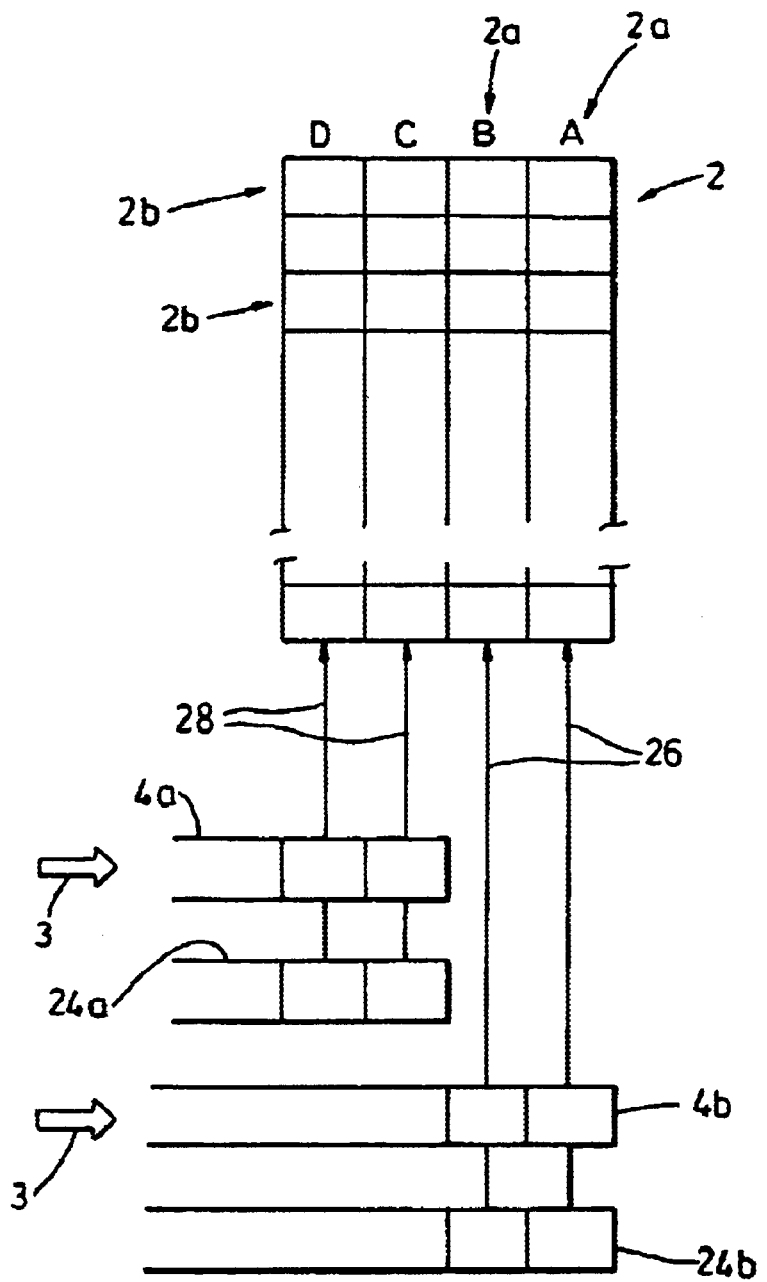
FIG. 4 shows schematically a memory architecture in accordance with a fourth embodiment of the present invention which enables interpolation of lost input data.

A memory architecture according to a further embodiment of the present invention is schematically shown in FIG. 4 and is referred to here as an interpolation-enabling memory architecture. It is described with reference to an example with only two input ports, although any number may be provided for.

Interpolation of lost data may be required where delay-sensitive information, such as audio signals, are transmitted using an asynchronous technology, such as ATM or IP. These systems involve multiplexing a number of channels onto a single bearer channel. There is no a-priori knowledge at the receiver of which channel will be received during any given time interval.

Furthermore, due to the statistical nature of an ATM network and due to error conditions that can occur, data units may be lost during transmission. It is important to monitor the loss of data, so that corrective action can be taken. For delay sensitive applications, such as voice transmission, lost data should be interpolated, to maintain the timing relationship between the transmit and receive functions, even in the case of payload loss.

One system for preserving the time progression of delay-sensitive data is to monitor each incoming data packet to determine whether a previously transmitted data packet is missing using a sequence number embedded in the transmitted data word. Once detected as missing, a data packet must be replaced with an interpolated data packet which must be slotted into the data sequence.

Of course, the interpolation can only take place once the subsequent data word has been received, so that the timing aspects become complicated.

The interpolation enabling architecture provides four memory banks A to D, for two serial input ports 3a and 3b. The input ports 3a and 3b are respectively provided with input memory buffers 4a and 4b which are analogous to the memory buffers of previously described embodiments. Additional interpolation buffers 24a and 24b are provided for the input ports 3a and 3b respectively. The aggregate rate of the common memory structure is sufficient to absorb the two data inputs at their peak rates, as well as being capable of providing sufficient instantaneous access capability effectively to double the access bandwidth to enable simultaneous interpolation of lost data words on each link.

The structure enable four octet samples to be written across the memory banks as in the earlier examples, but this arrangement includes two write address pointers, one associated with banks A and B, and the other associated with banks C and D.

As in the previous examples, data is written to the memory banks 2a in the preset sequence A, B, C, D, with one write-address pointer 26 used for accessing banks A and B and the other write-address pointer 28 accessing banks C and D. Once the data is stored, it is written contiguously across the four memory banks.

In general data received over the two data inputs 3a, 3b is written into the memory 2 in 2 octet chunks—the remaining 2 memory accesses writes are thus available to perform any necessary data interpolation. Data received on each input is thus converted to a sixteen bit parallel form which shall be processed on alternate clock cycles (i.e. link 1 has priority on the even access cycles link 2 has access to the memory on the even access cycles).

The access cycles are divided between the two inputs. Thus, alternate access cycles are dedicated to each input. Under normal operation (no loss of data) each data link buffers the received data via two octet FIFOs 4a, 4b, until it has access to the memory store 2. At that time it will write the data into either banks A and B or C and D dependent on the current phase of the data word. Again, a contiguous data word will be built up in the memory store. Since only two octets of data must be written every cycle, the other memory write pointer 26 or 28 will be free. Additionally, whenever the start of a new data word is detected, its control information is analysed to determine if the proceeding data word for that channel has been lost (typically using a sequence number).

If a lost data word has been detected the process determines the data values that it will use to interpolate the missing word (this might be the same as the last received data word or a preassigned value). The interpolated data is written into the interpolation FIFO 24a or 24b. Two base addresses are also calculated for the write address pointers; one for the interpolated data word and the other for the actual received data word (i.e. the word from which it was determined that a data word had been lost).

The received data word is then written into memory in the normal manner, namely 2 octets at a time every other access cycle, leaving the unused write address pointer to be used to write the interpolated data into the memory. The received data will be written into the correct memory location, because the fact that data has been missed is detected, so that the write address pointer can be advanced accordingly. The interpolated data can subsequently be written into the preceding memory location. This preserves the contiguous data structure, but of course introduces an unavoidable delay before the memory contents can correctly be read out.

To avoid clashes between the two processes (i.e. both wanting access to the same pair of memory banks and therefore wanting the same write address pointer) a short interpolation FIFO may be provided to stagger the writing of the interpolated data word to an opposite phase to the actual received data word. During writing of interpolation data into the memory, the two write address pointers are thus employed substantially simultaneously.

The use of the memory architecture for storing ATM signals, particularly AAL2 signals, has been mentioned above. The use of the memory architecture in an ATM system is only one example of a preferred use of the memory architecture of the invention. However, this particular use is described in further detail below.

Figure 5:
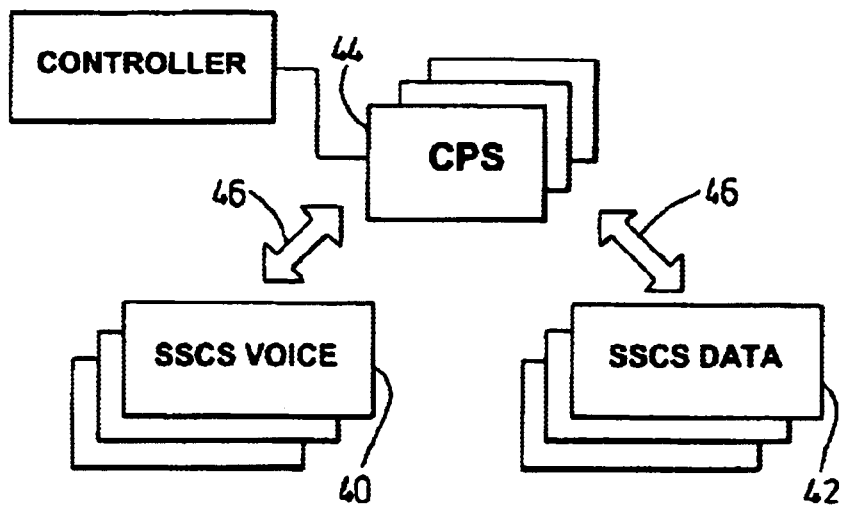
FIG. 5 shows achematically the functional partitioning of the ATM adaptation layer technology.

The functional partitioning of the ATM adaptation layer technology is illustrated in FIG. 5. A so-called Service Specific Convergence Sublayer (SSCS) Voice Device 40 assembles (and disassembles) voice channels into AAL1 or AAL5 ATM Service Data Units (SDUs) or into AAL2 mini-channel SDUs. An SSCS Data Device 42 assembles (and disassembles) data packets (e.g. IP) into either AAL5 ATM SDUs or AAL2 mini-channel SDUs. A so-called Common Part Sublayer (CPS) 44 device performs the functions of providing/reading ATM headers and AAL2 minichannel headers, and of multiplexing (and de-multiplexing) connections together onto a single physical interface. This system thereby supports all of the features of the key ATM adaptation layers AAL1, AAL2 and AAL5. Specialised devices (SSCSs) provide the voice and data functions, while a common CPS layer still retains the ability to multiplex voice and data services together onto the same physical ATM link and (for AAL2) within the same VCC connection. This architecture will be known to those skilled in the art.

A key aspect of the functional partitioning is the use of generic interfaces for the external service and network (ATM) layer and of generic ATM interfaces 46 for the interconnection of devices within the system. This extends the flexibility of the system and enables multiple devices to be connected together to form large capacity adaptation layer applications.

The system supports two key mode of operation:

i) An interworking function between the synchronous (TDM) domain and the asynchronous (ATM) domain. In this mode a number of SSCS devices are interconnected to the CPS devices to form the complete adaptation system.

ii) An AAL2 switching application, wherein CPS devices are interconnected directly together to form an AAL2 switch.

In either situation there is a requirement to provide a high capacity buffer organisation that is common to all input ports. The memory architecture of the invention is suitable for such buffering.

The principle used to partition the buffer allocation is to position the primary buffer at the logical output of the system. In others words, for data flow from the CPS to an SSCS, the primary buffer is in the SSCS, and for data flow from an SSCS to the CPS, the primary buffer is in the CPS. In all cases this output buffer has been dimensioned such that it can absorb an instantaneous burst of traffic equal to the peak rate of the maximum number of interconnected devices. This eliminates the requirement for any flow control between devices within the chip set, and minimises delay.

Buffering is necessary for data received from the ATM network to absorb cell or packet delay variations introduced by the ATM network, and buffering is necessary for data flow to the ATM network to ensure that the assembled ATM cells can be scheduled onto the physical ATM layer such that both overall and individually the virtual channels obey their pre-established traffic contracts.

Figure 6:
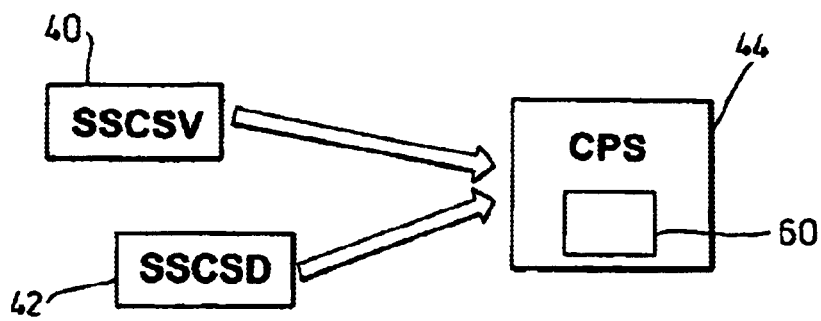
FIGS. 6 and 7 show achematically the buffer organisation in accordance with the invention for SSCS and CpS devices.
Figure 7:
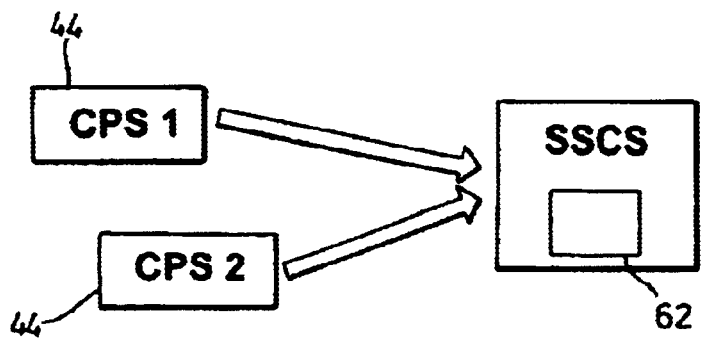

FIGS. 6 and 7 illustrate the buffer organisation of the invention for the SSCS and CPS devices. The organisation of the buffer distribution will now be described in further detail for the egress and ingress traffic directions. The positioning of the key buffering stages has largely been driven by the requirements of AAL2 switching. In AAL2 switching, all CPS buffering should be provided in the ingress direction i.e. when the CPS receives data from multiple SSCS devices. The CPS should act in flow-through mode for the egress direction, i.e. when data is supplied by the CPS to an SSCS.

As shown in FIG. 6, the CPS is provided with a memory architecture 50 of the invention to enable the scheduling of ATM cells onto the ATM layer device according to their priority and traffic contract. Further (for trunking, interworking and switching applications) buffering is also required in the CPS to enable the assembly of AAL2 SDUs into an ATM protocol data unit, again according to priority. The data on the interface comprises partial fragments. The amount of buffer storage required will vary according to the application and therefore to enable optimal use of this buffer it is provisioned in a dynamic way.

The ingress CPS function uses a memory architecture of the invention to enable i) multiple devices to be supported, ii) the provision of a low speed interface for control, iii) the use of partial fragments, and iv) receipt of partial AAL2 packets in the AAL2 switching case.

In the egress direction buffering is required in the SSCS for voice services (to eliminate delay variations) and for data services (to allow for the resegmentation of long data packets). Thus the SSCS includes a memory architecture 62 of the invention, as shown in FIG. 7. The amount of such buffering is dependent on the service being supported and is thus logically an SSCS function. Any additional buffering located within the CPS device is therefore sub-optimal and for this reason the egress CPS device acts in a full 'flow-through' mode having no intermediate buffering stage. This minimises the delay through the device (the CPS acts in flow through mode for AAL2 switching applications). Thus in egress all buffering is provided in the SSCS devices. Further, the organisation of the SSCS buffering architecture is such that it can buffer data received over the serial interconnects at a rate equal to the sum of the interconnected instantaneous peak link rates. This eliminates any requirement for flow control. The SSCS memory needs the ability to receive data over multiple links and the ability to interpolate lost data, and can therefore be implemented using the memory architecture of the invention.

The memory architecture may also be used as a converter to convert data from a frame based structure to a packet based structure, for example by storing different types of data in different memory areas for subsequent packetisation and multiplexing. Thus, the inputs may comprise frame based voice data to be multiplexed with other data, for example IP data for transmission over the Internet.

The memory architecture may form an AAL2 switch arranged as a plurality of interconnected CPS devices, which route received AAL2 input signals to outputs using the memory as an intermediate storage layer, the routing being dependent upon destination information accompanying the input data.

It is to be understood that the detailed disclosure describes mere embodiments of a broader invention and that many other embodiments within the scope of the present invention as claimed hereafter may occur to those skilled in the art.

The hardware and software required to implement the memory architecture has not been described in detail, as the architecture may be implemented using conventional hardware and the required control techniques will be apparent to those skilled in the art of memory design. It will be apparent that components of the embodiments disclosed herein may be substituted for known equivalents or arranged in alternative relationships to each other, or known equivalents, without departing from the scope of the inventions as claimed hereafter. For example, the invention has been described with reference to octet wide memory locations, but of course other arrangements are equally possible.

We claim:

1. A memory architecture comprising a common memory structure having a plurality of data locations for storing data units and an input section for providing a plurality of input ports with access to the common memory stucture, the input section including:

at least one memory buffer associated with each input port, each memory buffer capable of storing a number of data units at least equal to the number of input ports; and at least one data bus allowing each of the memory buffers to write a plurality of data units substantially simultaneously to the memory structure at least once during a memory-access cycle, different memory buffers being arranged to write their respective plurality of data units to the memory structure during different phases of the memory access cycle, the common memory structure including a plurality of memory banks, the number of memory banks being equal to or greater than the number of input ports, each memory bank being accessible substantially simultaneously to receive data units from a memory buffer during a phase of the memory access cycle, each data unit received from said memory buffer during said phase of a memory access cycle being written to a different memory bank.

2. The memory architecture according to claim 1, wherein the input ports are prioritised into at least one high priority input port(s) and at least one low priority input port(s), wherein the at least one low priority port(s) are enabled to write to the memory structure during a (nemory-aces cycle in place of at least one high priority port(s) when a given date rate condition for the at least one high priority input pod(s) is satisfied and disabled otherwise.

3. The memory architecture according to claim 1 further including packet-management control circuitry adapted to:

identify the start and end of data-packets and partial data packs; and provide that the start of each data packet is written to a predetermined memory bank.

4. The memory architecture according to claim 3, wherein the packet-management control circuit is further adapted to:

record at which memory bank the end of each partial data packet was written to; and provide that any subsequent partial packet for the same packet, is written to the next memory bank in a predetermined write-address sequence, whereby partial packet are written contiguously in the memory structure in a predetermined write-address sequence.

5. The memory architecture according to claim 1, wherein the memory structure includes at least two sets of memory banks, each set of memory banks being addressed independently during the memory-access cycle.

6. The memory architecture according to claim 5, wherein the number of sets of memory banks is determined in relation to the length of data words received at the input ports.

7. The architecture according to claim 5, wherein the number of memory banks is a multiple of the number of input ports.

8. The memory architecture according to claim 5, wherein one or more of the memory buffer is provided with an additional, interpalation buffer able to write data to one of to of the sets of memory banks substantially at the same time that a memory buffer writes to another set of memory banks.

9. The memory architecture according to claim 8 including an interpolation controller adapted to determine whether data portions belonging to a transmission sequence are received or missing.

10. The memory architecture according to claim 9 wherein the interpolation controller provides interpolation data to substitute any missing pieces of data belonging to a transmission sequence.

11. The memory architecture according to claim 8 including an additional delay buffer to stagger the writing of data from a memory buffer and an interpolation buffer to the same set of memory banks.

12. An ATM Common Part Sublayer Device for receiving multiple input signals in ATM format, including a memory architecture according to claim 1.

13. An ATM Service Specific Convergence Sublayer Device for receiving input signals from one or more ATM Common Part Sublayer Devices including a memory architecture according to claim 1.

14. A method of operating memory architecture to store a plurality of data units received from a plurality of input ports, the memory architecture comprising;:
  a common memory structure having a plurality of data locations for storing data units, the common memory structure including; a plurality of memory banks, the number of memory banks being equal to or greater than, the number of input ports; and
  an input section for providing the plurality of inputs ports with access to the common memory structure, the input section including; at least one memory buffer associated with each input port, each memory buffer capable of storing a number of data units at least equal to the number of input ports; and at least one data bus;
  the method comprising:
    writing a plurality of data units from each of the memory buffers substantially simultaneously to the memory structure at least once during a memory access cycle, different memory buffers writing their respective plurality of data units to the memory structure during different phases of the memory access cycle, each data unit received from a memory buffer during a phase of the memory access cycle being written to a different memory bank.

15. The method according to claim 14 additionally comprising the steps of:
  prioritising the input ports into high priority and low priority input ports;
  allocating phases of the memory access cycle to one of the high priority input ports; and
  writing date from the memory buffer of a low priority input port to the memory stucture in place of one of the memory buffers corresponding to a high priority input port, when a predetermined decision criteria is satified.

16. The method according to claim 15, wherein the decision criteria relates to the amount of data received at one or more of the high priority input ports during a given time interval.

17. The method according to claim 14 additionally comprising the steps of:
  monitoring data received at one or more of the input ports to identify data sequences to be provided in a common memory area;
  writing the data sequences to the common memory such that the first data unit of each data sequence is written to the same memory bank and the remainder of the data sequence is written contiguously in a predetermined sequence across all of the memory banks.

18. The method according to claim 14 additionally comprising the steps of:
  monitoring data received at one or more of the input ports to identify data sequences;
  determining from each received data unit of the sequence whether a preceding data unit in the data sequence is missing;
  providing for each missing data unit a substitute, interpolation data unit;
  writing the interpolation data unit and a received data unit later in the sequence to the common memory structure such that the data sequence is written contiguously to the common memory structure.

19. The method according to claim 18, wherein the memory structure comprises a first set of the memory banks and a second set of the memory banks, and wherein the received data unit later in the sequence is written into one of the sets of memory banks substantially at the same time that the interpolation unit is written to the other set of memory banks.

20. The method according to claim 18, wherein the interpolation data unit is written to an interpolation memory buffer which is associated with the input port at which the received date, unit indicating a missing preceding date unit, was received.

21. The method according to claim 20, wherein the interpolation data unit is written from the interpolation date buffer to a secondary interpolation buffer before writing the interpolation data word to the common memory.

* * * * *

UNITED STATES PATENT AND TRADEMARK OFFICE
CERTIFICATE OF CORRECTION

PATENT NO. : 6,728,254 B1
DATED : December 2, 2003
INVENTOR(S) : Dave Stacey et al.

It is certified that error appears in the above-identified patent and that said Letters Patent is hereby corrected as shown below:

Column 5,
Line 44, delete "multiples" and substitute -- multiple --

Column 7,
Line 2, delete "cane" and substitute -- can --

Column 9,
Line 9, delete "portions" and substitute -- can --

Column 11,
Line 13, delete "delete "enable" and substitute -- enables --

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,728,254 B1 |
| APPLICATION NO. | : 09/411283 |
| DATED | : December 2, 2003 |
| INVENTOR(S) | : Dave Stacey et al. |

It is certified that error appears in the above-identified patent and that said Letters Patent is hereby corrected as shown below:

<u>Column 5,</u>
Line 44, delete "multiples" and substitute -- multiple --

<u>Column 7,</u>
Line 2, delete "cane" and substitute -- can --

<u>Column 9,</u>
Line 9, delete "portions" and substitute -- portion --

<u>Column 11,</u>
Line 13, delete "enable" and substitute -- enables --

This certificate supersedes Certificate of Correction issed May 31, 2005.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,728,254 B1 | Page 1 of 1 |
| APPLICATION NO. | : 09/411283 | |
| DATED | : April 27, 2004 | |
| INVENTOR(S) | : Dave Stacey et al. | |

It is certified that error appears in the above-identified patent and that said Letters Patent is hereby corrected as shown below:

Column 5,
Line 44, delete "multiples" and substitute -- multiple --

Column 7,
Line 2, delete "cane" and substitute -- can --

Column 9,
Line 9, delete "portions" and substitute -- portion --

Column 11,
Line 13, delete "enable" and substitute -- enables --

This certificate supersedes Certificate of Correction issued May 31, 2005 and August 7, 2007.

Signed and Sealed this

Fourth Day of September, 2007

JON W. DUDAS
*Director of the United States Patent and Trademark Office*